(12) United States Patent
Li et al.

(10) Patent No.: US 12,446,625 B2
(45) Date of Patent: Oct. 21, 2025

(54) VAPOR GENERATION DEVICE AND SUSCEPTOR

(71) Applicant: SHENZHEN FIRST UNION TECHNOLOGY CO., LTD., Shenzhen (CN)

(72) Inventors: Junhui Li, Shenzhen (CN); Baoling Lei, Shenzhen (CN); Zuqiang Qi, Shenzhen (CN); Xiaofeng Tang, Shenzhen (CN); Saisheng Zhu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

(*) Notice: Subject to any disclaimer, the term of this patent is extended or adjusted under 35 U.S.C. 154(b) by 393 days.

(21) Appl. No.: 17/925,007

(22) PCT Filed: May 12, 2021

(86) PCT No.: PCT/CN2021/093418
§ 371 (c)(1),
(2) Date: Nov. 13, 2022

(87) PCT Pub. No.: WO2021/228157
PCT Pub. Date: Nov. 18, 2021

(65) Prior Publication Data
US 2023/0180839 A1    Jun. 15, 2023

(30) Foreign Application Priority Data

May 12, 2020   (CN) .......................... 202020796480.8
May 25, 2020   (CN) .......................... 202010451178.3

(51) Int. Cl.
A24F 40/465   (2020.01)
A24F 40/20    (2020.01)
(Continued)

(52) U.S. Cl.
CPC ............ *A24F 40/465* (2020.01); *A24F 40/20* (2020.01); *A24F 40/51* (2020.01); *H05B 6/105* (2013.01)

(58) Field of Classification Search
CPC ...................................... A24F 40/465
See application file for complete search history.

(56) References Cited

U.S. PATENT DOCUMENTS

2018/0325179 A1* 11/2018 Li .................. H05B 1/0252
2021/0307397 A1* 10/2021 Liu ................. A24F 40/51

FOREIGN PATENT DOCUMENTS

CN    108903062 A    11/2018
CN    109077361 A    12/2018
(Continued)

*Primary Examiner* — Cynthia Szewczyk
(74) *Attorney, Agent, or Firm* — Cheng-Ju Chiang

(57) ABSTRACT

A vapor generation device and a susceptor thereof are disclosed. The susceptor is in a blade shape extending in an axial direction of a cavity, and includes: a first part having a first size in a thickness direction, and a second part having a second size in the thickness direction, the second size being greater than the first size. An accommodation cavity extending in the axial direction is further arranged in the second part, and the accommodation cavity is configured to accommodate or encapsulate a temperature sensor that senses a temperature of the susceptor. The vapor generation device and the susceptor of this application encapsulates or accommodates the temperature sensor in the susceptor. Hence, a sensing part may be basically insulated from the impact of the magnetic field, and the susceptor and the temperature sensor may be integrated to increase stability of mounting and accuracy of temperature detecting.

20 Claims, 6 Drawing Sheets

(51) Int. Cl.
*A24F 40/51* (2020.01)
*H05B 6/10* (2006.01)

(56) References Cited

FOREIGN PATENT DOCUMENTS

| | | |
|---|---|---|
| CN | 208228311 U | 12/2018 |
| CN | 208446607 U | 2/2019 |
| CN | 109805446 A | 5/2019 |
| CN | 209031260 U | 6/2019 |
| CN | 209931492 U | 1/2020 |
| CN | 209931506 U | 1/2020 |
| CN | 111031820 A | 4/2020 |
| CN | 212464915 U | 2/2021 |
| CN | 212852505 U | 4/2021 |
| JP | 2019-134701 A | 8/2019 |
| WO | 2015/176898 A1 | 11/2015 |
| WO | 2018/220558 A1 | 12/2018 |
| WO | 2019/199010 A1 | 10/2019 |
| WO | 2020/064683 A1 | 4/2020 |
| WO | 2020/064686 A1 | 4/2020 |

\* cited by examiner

VAPOR GENERATION DEVICE AND SUSCEPTOR

CROSS-REFERENCE TO RELATED APPLICATIONS

This application is a 35 U.S.C. § 371 National Phase conversion of International PCT) Patent Application No. PCT/CN2021/093418, filed on May 12, 2021, which claims priority to Chinese Patent Application No. 202020796480.8, filed with the National Intellectual Property Administration, P.R.C. on May 12, 2020 and entitled "VAPOR GENERATION DEVICE AND SUSCEPTOR", and this application further claims priority to Chinese Patent Application No. 202010451178.3, filed with the National Intellectual Property Administration, P.R.C. on May 25, 2020 and entitled "VAPOR GENERATION DEVICE, SUSCEPTOR, AND PREPARATION METHOD", which are incorporated herein by reference. The PCT International Patent Application was filed and published in Chinese.

TECHNICAL FIELD

Embodiments of this application relate to the field of heat-not-burn cigarette device technologies, and in particular, to a vapor generation device and a susceptor.

BACKGROUND

Tobacco products (such as cigarettes, cigars, and the like) burn tobacco during use to produce tobacco smoke. Attempts are made to replace these tobacco-burning products by making products that release compounds without burning.

An example of this type of products is a heating device that releases compounds by heating rather than burning materials. For example, the materials may be tobacco or other non-tobacco products. These non-tobacco products may include or not include nicotine. As another example, the related art provides a heating device of an electromagnetic induction heating type. A structure of the heating device is shown in FIG. 1. When a tobacco product 1 is accommodated in the heating device, a susceptor 2 is penetrated by an alternating magnetic field generated by an induction coil 3 to inductively generate heat, thereby heating the tobacco product 1. During heating, for convenience of monitoring a heating temperature of the tobacco product 1 in real time, the heating device adopts a temperature sensor 4 that is closely attached to the susceptor 2 to sense a real-time operating temperature of the susceptor 2. The heating device adjusts parameters of the alternating magnetic field generated by the induction coil 3 based on a sensing result of the temperature sensor 4, so that the susceptor 2 is within an appropriate heating temperature range.

During implementation of foregoing temperature detection by the temperature sensor 4, on the one hand, the temperature sensor 4 is usually made of a thermistor metal material and will generate heat by itself in the alternating magnetic field. On the other hand, the temperature sensor 4 made of metal materials and the susceptor 2 each generate an induced current, which affects a sensing signal outputted by the temperature sensor 4, thereby affecting the accuracy of the sensing signal.

SUMMARY

To resolve the problem of accuracy of temperature monitoring by a vapor generation device in the related art, the embodiments of this application provide a susceptor for a vapor generation device and a vapor generation device.

According to a first aspect, a vapor generation device is provided, configured to heat an inhalable material to generate an aerosol, and including:

a cavity, configured to accommodate the inhalable material;

a magnetic field generator, configured to generate a changing magnetic field; and a susceptor, configured to be penetrated by the changing magnetic field and generate heat, to heat the inhalable material accommodated in the cavity, where the susceptor is constructed in a blade shape extending in an axial direction of the cavity, and includes:

a first part, having a first size in a thickness direction of the susceptor; and a second part, having a second size in the thickness direction of the susceptor, the second size being greater than the first size, an accommodation cavity extending in the axial direction being arranged in the second part, and the accommodation cavity being configured to accommodate or encapsulate a temperature sensor that senses a temperature of the susceptor.

In some embodiments, the susceptor includes a first sheet-like object and a second sheet-like object that are opposite to each other in the thickness direction, and the accommodation cavity is formed between the first sheet-like object and the second sheet-like object.

In some embodiments, the temperature sensor further includes a conductive connection portion at least partially located outside the susceptor, to receive the temperature sensed by the temperature sensor through the conductive connection portion during use.

In some embodiments, the conductive connection portion includes a long and thin conductive pin.

In some embodiments, the conductive connection portion includes an electrical contact formed on or integrated into a surface of the susceptor.

In some embodiments, the susceptor further includes a base part configured to hold the first part and the second part; and the electrical contact is formed on or integrated into a surface of the base part.

In some embodiments, the cavity has an opening end that receives the inhalable material in a removable manner; and a protrusion height of at least a part of the second part relative to the first part gradually decreases in a direction close to the opening end.

In some embodiments, the cavity has an opening end that receives the inhalable material in a removable manner;

the accommodation cavity includes a conical region whose cross-sectional area gradually decreases in a direction close to the opening end; and the temperature sensor is accommodated or encapsulated in the conical region.

In some embodiments, the first part is provided with a vacancy extending in a length direction; and the second part is constructed to be a pin or in a needle shape extending in the length direction, and is held in the vacancy.

In some embodiments, a surface of the second part is a smooth arc surface.

In some embodiments, the first sheet-like object and/or the second sheet-like object is provided with a protruding part protruding outward in the thickness direction, and the protruding part defines the accommodation cavity.

According to a second aspect, a susceptor for a vapor generation device is provided, configured to be penetrated by a changing magnetic field and generate heat, to heat an inhalable material, where the susceptor is constructed in a blade shape extending in an axial direction of the cavity, and includes:

a first part, having a first size in a thickness direction of the susceptor; and a second part, having a second size in the thickness direction of the susceptor, the second size being greater than the first size, an accommodation cavity extending in the axial direction being arranged in the second part, and the accommodation cavity being configured to accommodate or encapsulate a temperature sensor that senses a temperature of the susceptor.

The vapor generation device and the susceptor of this application encapsulates or accommodates the temperature sensor in the susceptor. In this way, on the one hand, a sensing part may be basically insulated from the impact of the magnetic field, and on the other hand, the susceptor and the temperature sensor may be integrated to increase the stability of mounting and the accuracy of temperature detecting, and meanwhile, overall replacement and mounting are easier.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show merely some embodiments of this application, and a person of ordinary skill in the art may still derive other drawings from the accompanying drawings without creative efforts.

DETAILED DESCRIPTION

For ease of understanding of this application, this application is described below in more detail with reference to accompanying drawings and specific implementations.

Figure 1:
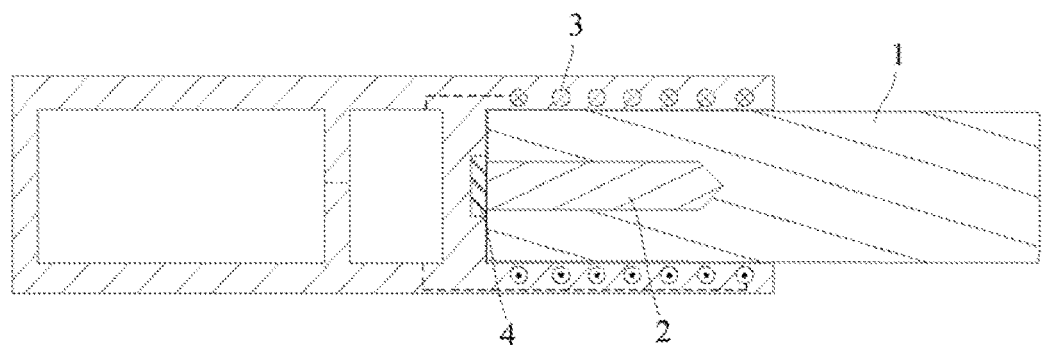
FIG. 1 is a schematic structural diagram of an existing heating device of an electromagnetic induction heating type.
Figure 2:
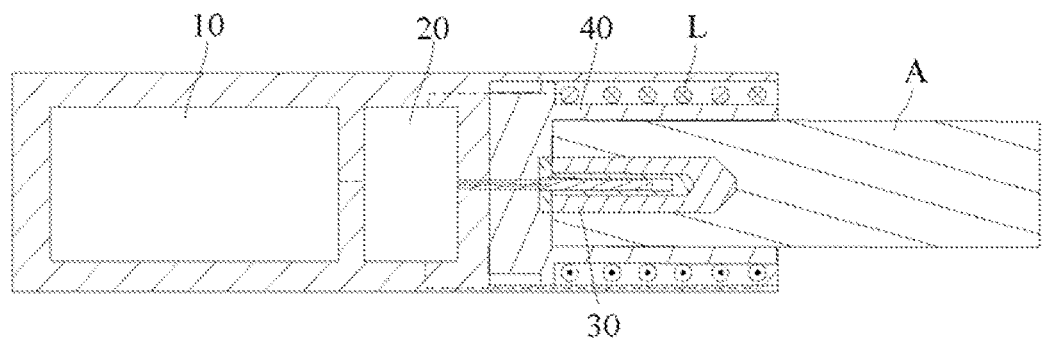
FIG. 2 is a schematic structural diagram of a vapor generation device according to an embodiment of this application.

Referring to FIG. 2, a vapor generation device provided in an embodiment of this application includes:

a cavity that accommodates an inhalable material A, such as a cigarette, in a removable manner;

an inductance coil L as a magnetic field generator, configured to generate an alternating magnetic field under an alternating current;

a susceptor 30, at least partially extending in the cavity and configured to be inductively coupled to the inductance coil L, where the susceptor 30 is penetrated by the alternating magnetic field and generates heat to heat the inhalable material A, so that at least one component of the inhalable material A evaporates and forms an aerosol for inhaling;

a core 10 that is a rechargeable direct-current core and can supply a direct-current voltage and a direct current; and a circuit 20 that is electrically connected to the rechargeable core 10, and converts the direct current outputted by the core 10 into an alternating current with a suitable frequency and supplies the alternating current to the inductance coil L.

According to settings in use of the vapor generation device, the inductance coil L may include a cylindrical inductor coil wound into a spiral shape, as shown in FIG. 2. The cylindrical inductance coil L wound into the spiral shape may have a radius r ranging from about 5 mm to about 10 mm, and the radius r may be about 7 mm in particular. The cylindrical inductance coil L wound into the spiral shape may have a length ranging from about 8 mm to about 14 mm, and the number of turns of the inductance coil L may range from 8 to 15. Correspondingly, an inner volume may range from about 0.15 $cm^3$ to about 1.10 $cm^3$.

In a more exemplary implementation, a frequency of the alternating current supplied by the circuit 20 to the inductance coil L ranges from 80 KHz to 400 KHz, and more specifically, the frequency may range from about 200 KHz to 300 KHz.

In an exemplary embodiment, the direct-current voltage supplied by the core 10 ranges from about 2.5 V to about 9.0 V, and the direct current supplied by the core 10 ranges from about 2.5 A to about 20 A.

In an exemplary embodiment, the susceptor 30 in FIG. 2 is made of a metal or an alloy material with an appropriate magnetic conductivity, so that when used, the susceptor 30 can inductively generate heat corresponding to the magnetic field to heat the accommodated inhalable material A to generate the aerosol for inhaling. The susceptor 30 may be made of grade 420 stainless steel (SS420), and an alloy material (such as J85/J66 permalloy) containing iron and nickel.

In the embodiment shown in FIG. 2, the vapor generation device further includes a tubular holder 40 configured to arrange the inductance coil L and mount the susceptor 30. The tubular holder 40 may be made of a high-temperature resistant non-metal material, for example, PEEK, ceramic, or the like. During implementation, the inductance coil L is arranged on an outer wall of the tubular holder 40 in a spirally wound manner, and at least a part of the tubular holder 40 is internally hollow to form the cavity configured to accommodate the inhalable material A.

Figure 3:
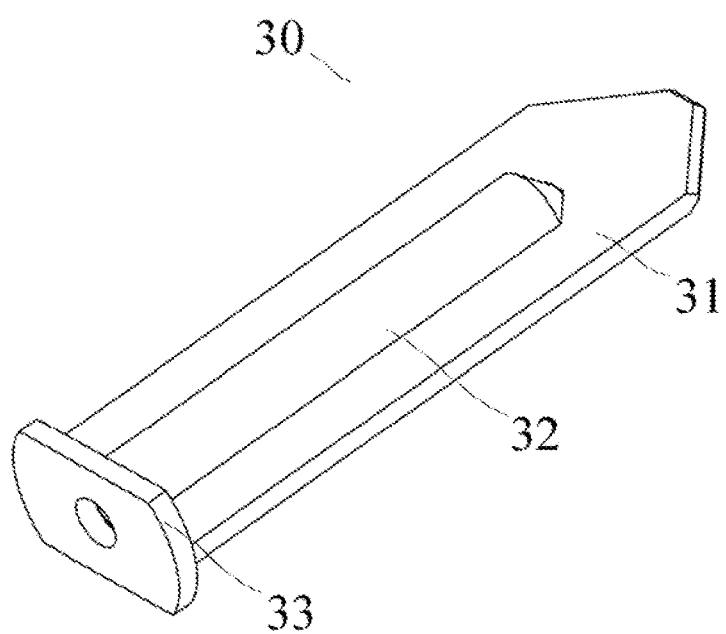
FIG. 3 is a schematic structural diagram of a susceptor in FIG. 2.
Figure 4:
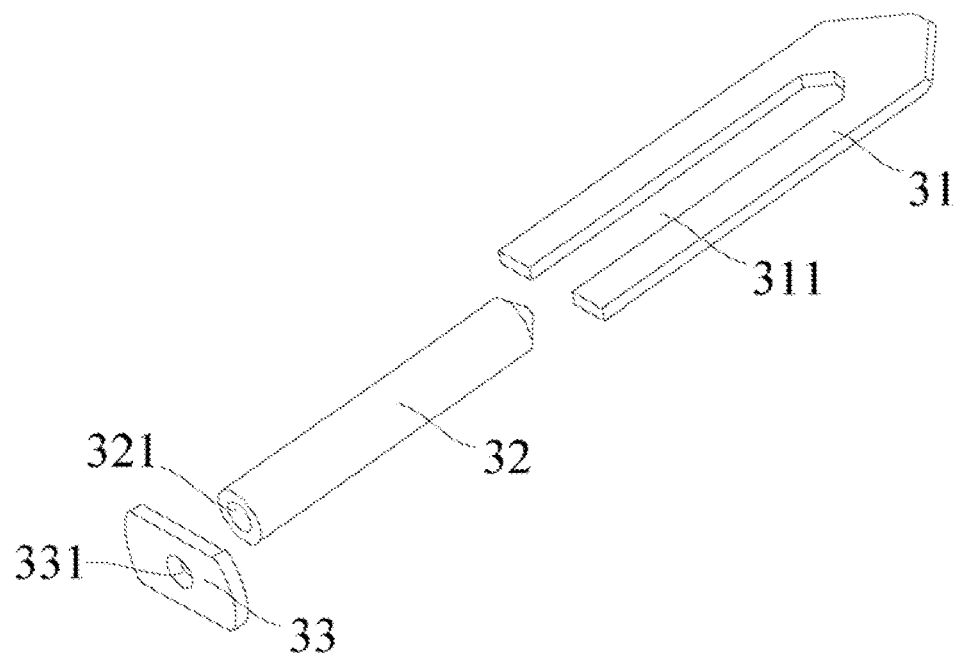
FIG. 4 is a schematic exploded view of parts of the susceptor shown in FIG. 3.

Referring to FIG. 3 and FIG. 4 together, the susceptor 30 includes: a first part 31 constructed in a blade shape extending in an axial direction of the cavity, and a second part 32 constructed to be a pin or in a needle shape extending in the axial direction of the cavity. In addition, during implementation, the first part 31 has a vacancy 311 extending in the axial direction, and the second part 32 is held in the vacancy 311. During use, the first part 31 and the second part 32 may be simultaneously inserted into the inhalable material A and then heat the inhalable material A.

Figure 5:
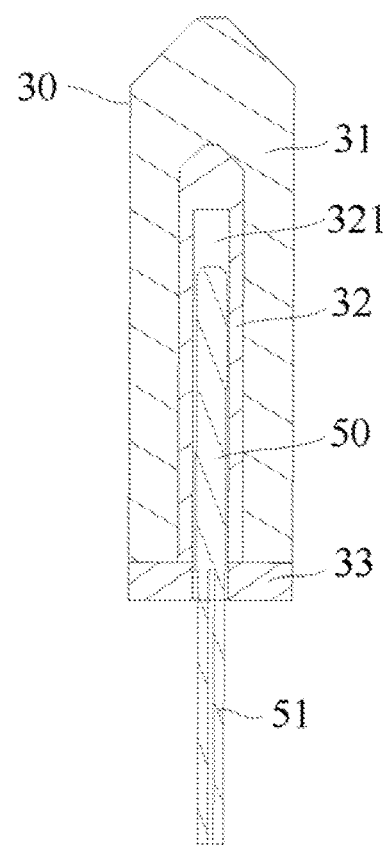
FIG. 5 is a schematic cross-sectional view of the susceptor in FIG. 2 in which a temperature sensor is encapsulated.

Referring to FIG. 4 and FIG. 5 together, based on an idea of accurately detecting a temperature of the susceptor 30, the second part 32 is a hollow structure in which an accommodation cavity 321 extending in the axial direction is arranged. During use, the accommodation cavity 321 is configured to accommodate and encapsulate a temperature sensor 50. Certainly, after fixed in the accommodation cavity 321, the temperature sensor may be encapsulated inside the second part 32 by gluing, and the like, and is closely attached to an inner wall of the second part 32, so as to accurately detect a real-time operating temperature of the susceptor 30.

Referring to FIG. 3 and FIG. 4 again, for ease of mounting and fixing the susceptor 30, the susceptor further includes a base part 33. The first part 31, the second part 32, and the base part 33 are fixed as an indivisible integral by soldering, interference fitting, or the like. During use, the base part 33 is constructed into a plate perpendicular to the first part 31 and the second part 32, and has a size greater than that of the first part 31 and the second part 32, so as to be mounted and fixed in the tubular holder 40 by abutting, clamping, and the like.

Meanwhile, the base part 33 has a through hole 331 configured for a conductive pin 51 of the temperature sensor 50 to run through and be exposed outside the susceptor 30, so that the conductive pin 51 is electrically connected to the circuit 20 to supply power and receive a sensing signal.

It may be learnt from FIG. 3 and FIG. 4 that, a size of an outer diameter of the second part 32 is greater than a thickness of a sheet of the first part. Therefore, the second part 32 can protrude from two sides of the first part 31 in a thickness direction, so that the susceptor 30 can have a relatively larger surface area to be in contact with the inhalable material A, thereby increasing the efficiency of heat transfer during heating.

In some embodiments, meanwhile, in order to avoid heat damage of the tubular holder 40 caused by heat transfer from the base part 33 to the tubular holder 40, the base part 33 is made of a material with a low thermal conductivity, for example, zirconia ceramic, and the like.

In some embodiments, the first part 31 and the second part 32 may be fixed by close fitting, and the like.

Referring to FIG. 6, in some embodiments, an outer surface of a second part **32*a* is provided with grooves 322*a* extending in the axial direction. A first part 31 may be integrated with the second part 32*a* by being embedded into the grooves 322*a*** to be clamped.

Referring to FIG. 7, in some embodiments, for ease of detaching and replacing a susceptor **30*b*, after a temperature sensor (encapsulated in the susceptor 30*b* and not shown) is encapsulated in the second part 32*a* through a through hole 311*b* of a base part 33*b*, a conductive contact 51*b* which is exposed outside an outer surface of the susceptor 30*b* is formed on a surface of the base part 33*b* by printing, coating, depositing, or etching, and is configured to be connected to a pin of the temperature sensor by soldering, and the like. During use, the circuit 20 may abut against the conductive contact 51*b* by a contact conductive mechanism such as a commonly used conductive elastic pin, to supply power to the temperature sensor or receive a sensing signal, so as to avoid inconvenience caused to the replacing and detaching of the susceptor 30*b* by soldering the pin of the temperature sensor to the circuit 20**.

Referring to FIG. 8 and FIG. 9 together, in some embodiments, a susceptor **30*c* is constructed into a blade shape, and has a first end 31*c* and a second end 32*c*. The first end 31*c* is opposite to an opening of the cavity configured to accommodate the inhalable material A. During use, the first end 31*c*, as a free end, is constructed into a tip shape for being easily inserted into the inhalable material A that is accommodated in the cavity through an opening end. The second end 32*c*, as an end portion for mounting and connecting, is configured to provide support through the tubular holder 40, so that the susceptor 30*c*** is stably held and fixedly mounted in the device.

In some implementations, the construction of the susceptor **30*c* is formed by a first sheet-like object 310*c* and a second sheet-like object 320*c* that are opposite to each other in the thickness direction. Specifically, the first sheet-like object 310*c* includes a flat and straight first part 311*c*, a second part 312*c* formed by the first part 311*c* protruding outward in the thickness direction, and a third part 313*c* formed by at least a part of the first part 311*c* close to the second end 32*c* extending in a width direction. Correspondingly, a shape of the second sheet-like object 320*c* is similar to that of the first sheet-like object 310*c*. The second sheet-like object 320*c* also has a flat and straight fourth part 321*c*, a fifth part 322*c* formed by the fourth part 321*c* protruding outward in the thickness direction, and a sixth part 323*c* formed by at least a part of the fourth part 321*c* close to the second end 32*c* extending in the width direction. After the first sheet-like object 310*c* and the second sheet-like object 320*c* are combined, an accommodation cavity 330*c* configured to accommodate and encapsulate a temperature sensor 340*c* is formed between the two sheet-like objects. Specifically, the accommodation cavity 330*c* is formed by a first recessed structure 331*c* formed by the second part 312*c* of the first sheet-like object 310*c*, and a second recessed structure 332 formed by the fifth part 322*c* of the second sheet-like object 320*c***.

During assembling, a sensing part **341*c* of the temperature sensor 340*c* is accommodated and encapsulated in the accommodation cavity 330*c*, and may be encapsulated and fixed by gluing, and the like. Meanwhile, an electrical connection part 342*c* of the temperature sensor 340*c* is designed into a long and thin pin and runs through the second end 32*c* from the accommodation cavity 330*c* to the outside of the susceptor 30*c*, so as to be conveniently connected to the circuit 20. Then, the circuit 20 may receive a sensing signal of the sensing part 341*c* through the electrical connection part 342. During use, the temperature sensor 340*c* is encapsulated in the accommodation cavity 330*c* that is overall insulated from a magnetic field. The sensing part 341*c* closely abuts against the first sheet-like object 310*c* and/or the second sheet-like object 320*c*. In this way, a temperature of the susceptor 30*c*** can be detected stably or accurately while avoiding interference by the magnetic field.

Furthermore, the temperature sensor **340*c*** may be a thermistor temperature sensor that calculates the temperature by monitoring a change of resistance, for example, PT1000, or may be a thermocouple temperature sensor that calculates the temperature by calculating thermo-electromotive forces at two ends.

Based on an idea of mass production and preparation of the susceptor **30*c*, furthermore, in an exemplary implementation, the second part 312*c* of the first sheet-like object 310*c* and/or the fifth part 322*c* of the second sheet-like object 320*c*** are/is formed or prepared by stamping on the foregoing flat sheet-like sensing material, such as a sheet metal part. Meanwhile, in a stable connection, the first sheet-like object 310c and the second sheet-like object 320c may be integrated by soldering, such as, laser soldering, and the like.

In some embodiments, the accommodation cavity 330c extends in an axial direction of the susceptor 30c. During implementation, a cross section of the accommodation cavity 330c may generally be in a diamond shape, a circle shape, a square shape, or the like.

Figure 9:
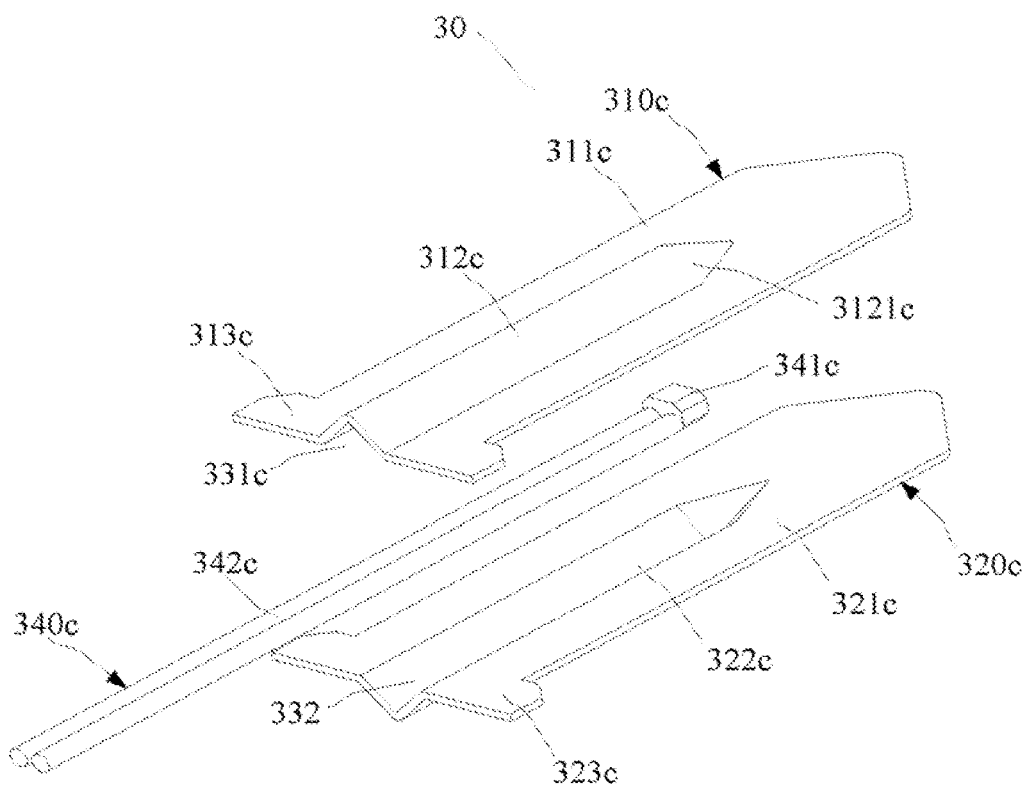
FIG. 9 is a schematic exploded view of parts of the susceptor in FIG. 8 before assembly.

As shown in FIG. 9, the second part 321c has a conical part 3121c that is close to the first end 31c of the susceptor 30c and whose cross-sectional area gradually decreases, for example, a circular cone, a triangular cone, or the like. The conical part 3121c is configured to reduce resistance when inserted into the inhalable material A.

In some embodiments, the conical part 3121c of the second part 312c, together with the corresponding fifth part 322c that has a similar structure, may cause a front part of the formed accommodation cavity 330c close to the first end 31c to be in a cone shape. During mounting, the sensing part 341c of the temperature sensor 340c abuts against the cone-shaped front part of the accommodation cavity 330c, for ease of close fitting and mounting.

According to the embodiment shown in the figure, in the susceptor 30c, a size of the accommodation cavity 330c formed by the second part 312c and the fifth part 322c in the thickness direction is greater than other part of the susceptor 30c. Meanwhile, a size of thickness of the accommodation cavity 330c formed by the second part 312c and the fifth part 322c gradually increases inward in the width direction, so that an outer surface of the susceptor 30c formed by the second part 312c and the fifth part 322c gradually changes. On the one hand, a contact area with the inhalable material A is increased to improve the efficiency of heat transfer. On the other hand, the resistance is reduced when the susceptor 30c is inserted into the inhalable material A.

Figure 10:
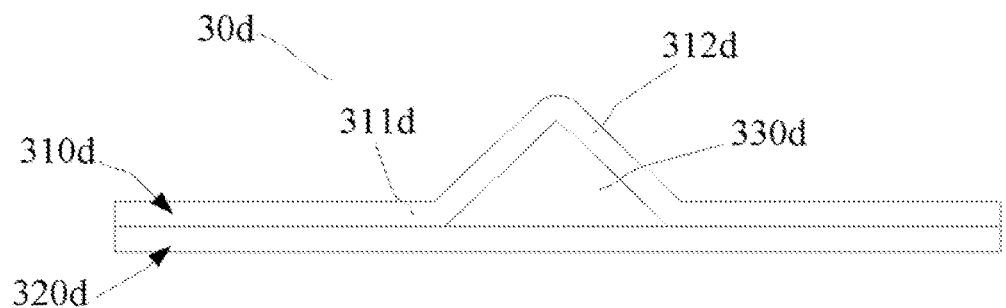
FIG. 10 is a schematic structural diagram of a susceptor according to another embodiment.
Figure 11:
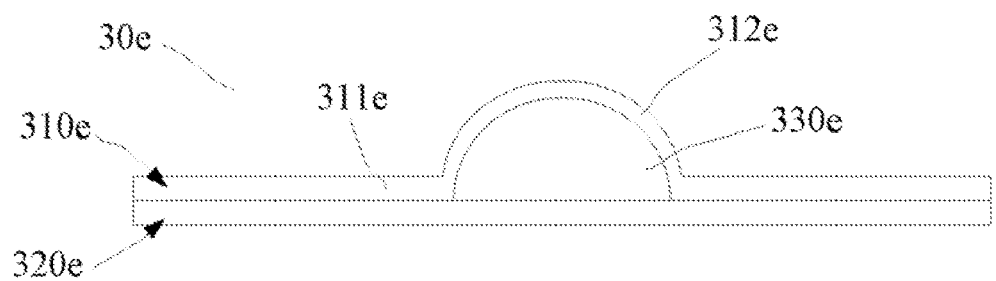
FIG. 11 is a schematic structural diagram of a susceptor according to another embodiment.

Referring to FIG. 10 and FIG. 11 together, in another embodiment, a second sheet-like object 320d/320e of a susceptor 30d/30e is flat and straight. A second part 312d/312e protruding outward in the thickness direction is formed only on the second sheet-like object 310d/310e by stamping, or the like. An accommodation cavity 330d/330e configured to accommodate or encapsulate a temperature sensor is formed between the second part 312d/312e and the second sheet-like object 320d/320e.

Figure 6:
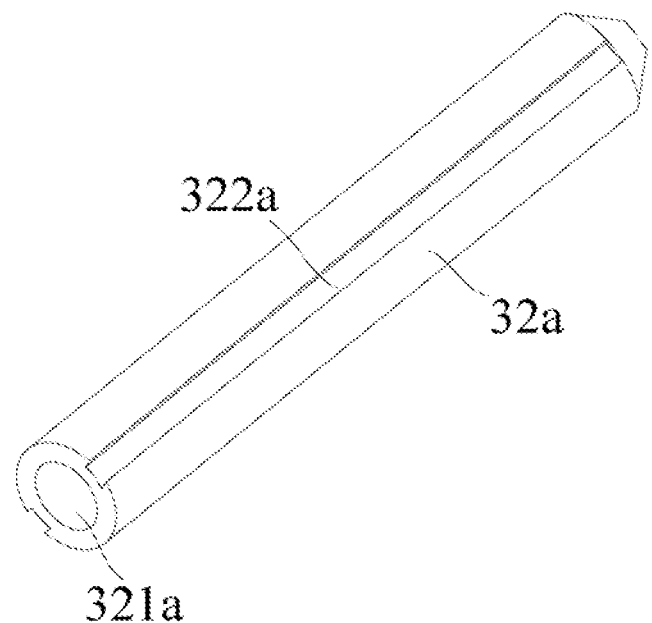
FIG. 6 is a schematic diagram of a second part of a susceptor according to another embodiment.
Figure 7:
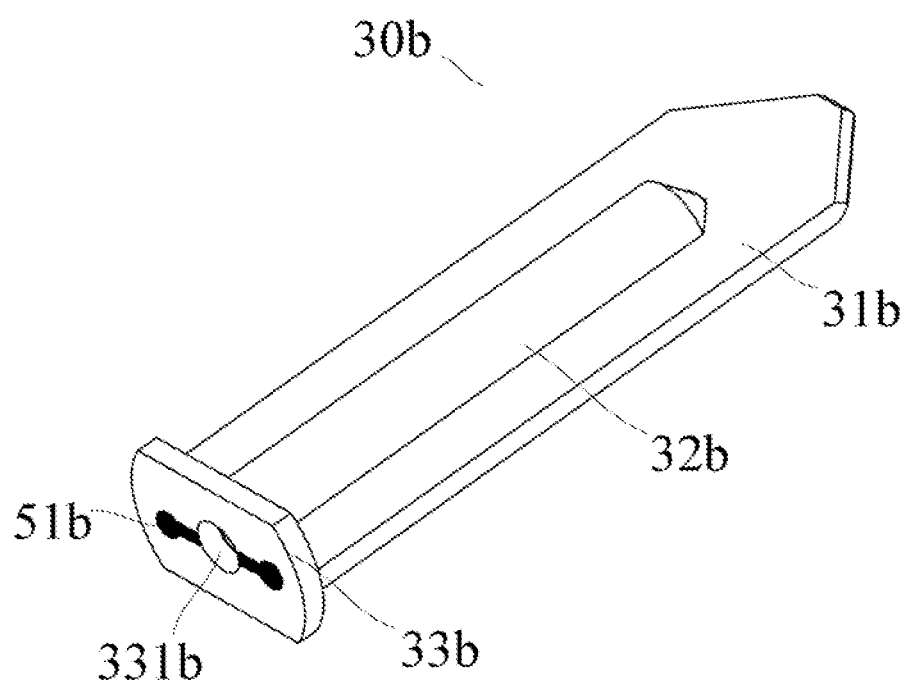
FIG. 7 is a schematic structural diagram of a susceptor according to another embodiment.
Figure 8:
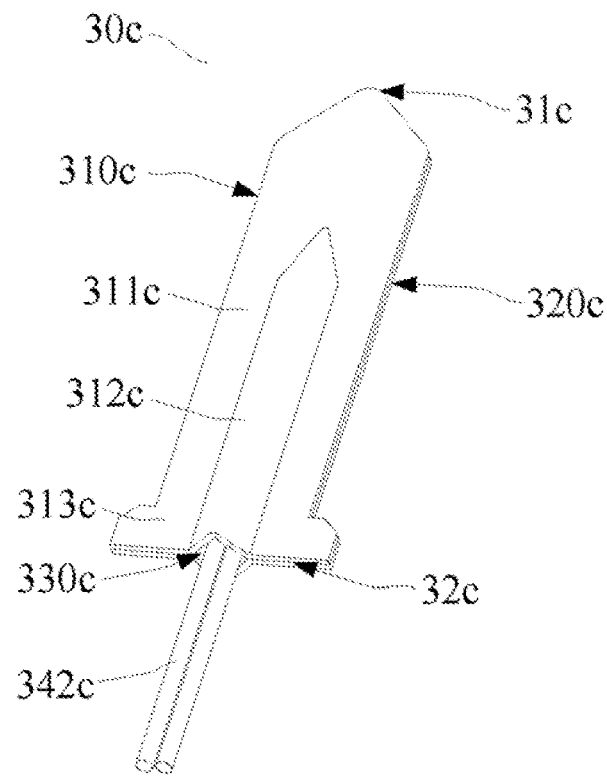
FIG. 8 is a schematic structural diagram of a susceptor according to another embodiment.

According to the embodiment shown in FIG. 5 or FIG. 6, a cross section of the second part 312d/312e may generally be in a triangle shape or a circular arc shape whose size of thickness gradually increases inward in the width direction. It may be seen from FIG. 5 and FIG. 6 that a size of protruding of the second part 312d/312e in the thickness direction is greater than a size of thickness of a first part 311d/311e.

Figure 12:
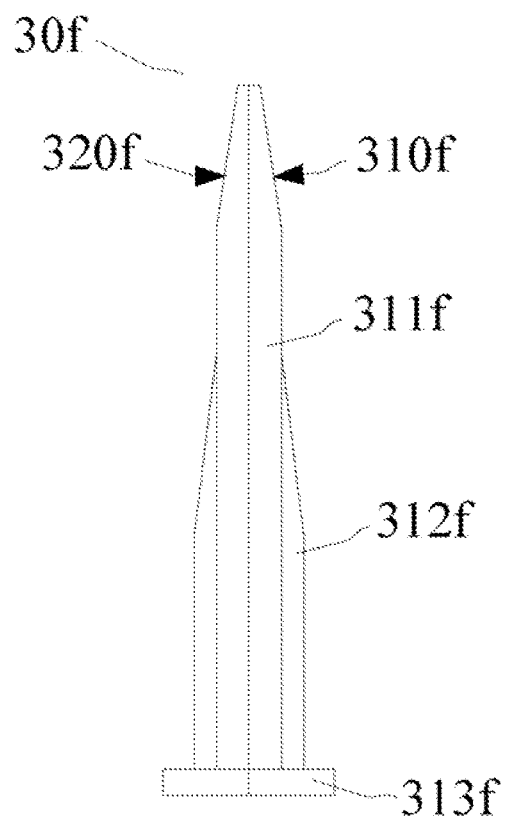
FIG. 12 is a schematic structural diagram of a susceptor according to another embodiment.

Referring to FIG. 12, in another embodiment, along a susceptor 30f, a third part 313f of a first sheet-like object 310f of the susceptor 30f has a size of thickness greater than that of a first part 311f and a second part 312f. In this way, the third part 313f protrudes relative to other parts in the thickness direction, so as to be easily mounted or held in the device.

The vapor generation device and the susceptor of this application encapsulates or accommodates the temperature sensor in the susceptor. In this way, on the one hand, a sensing part may be basically insulated from the impact of the magnetic field, and on the other hand, the susceptor and the temperature sensor may be integrated to increase the stability of mounting and the accuracy of temperature detecting, and meanwhile, overall replacement and mounting are easier.

Figure 13:
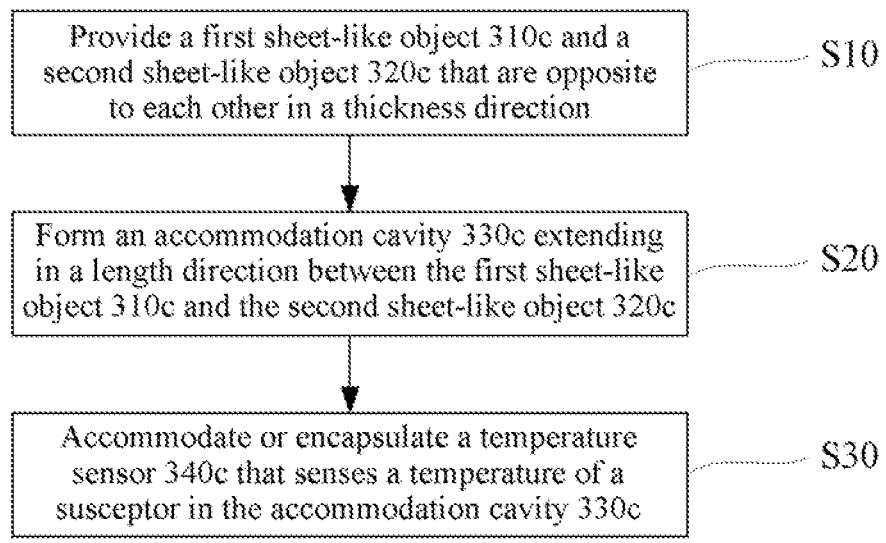
FIG. 13 is a schematic flowchart of a preparation method of a susceptor according to an embodiment.

This application further provides a method for preparing the foregoing susceptor 30c. Referring to FIG. 13, steps of the method include:

S10: Provide a first sheet-like object 310c and a second sheet-like object 320c that are opposite to each other in a thickness direction;

S20: Form an accommodation cavity 330c extending in a length direction between the first sheet-like object 310c and the second sheet-like object 320c; and S30: Obtain a temperature sensor 340c and accommodate or encapsulate the temperature sensor 340c in the accommodation cavity 330c.

It should be noted that, the specification of this application and the accompanying drawings thereof illustrate exemplary embodiments of this application, but this application is not limited to the embodiments described in this specification, furthermore, a person of ordinary skill in the art may make improvements or modifications according to the foregoing description, and all of the improvements and modifications should all fall within the protection scope of the attached claims of this application.

What is claimed is:

1. A vapor generation device, configured to heat an inhalable material to generate an aerosol, the device comprising:
a cavity, configured to accommodate the inhalable material;
a magnetic field generator, configured to generate a changing magnetic field; and
a susceptor, configured to be penetrated by the changing magnetic field and generate heat, to heat the inhalable material accommodated in the cavity; wherein
the susceptor is constructed in a blade shape extending in an axial direction of the cavity, and comprises:
a first part, having a first size in a thickness direction of the susceptor; and
a second part, having a second size in the thickness direction of the susceptor, the second size being greater than the first size, an accommodation cavity extending in the axial direction being arranged in the second part, and the accommodation cavity being configured to accommodate or encapsulate a temperature sensor that senses a temperature of the susceptor;
wherein the susceptor comprises a first sheet-like object and a second sheet-like object that are opposite to each other in the thickness direction, and are separate parts before assembly, the accommodation cavity is formed between the first sheet-like object and the second sheet-like object after being assembled.

2. The vapor generation device according to claim 1, wherein the temperature sensor further comprises a conductive connection portion at least partially located outside the susceptor, to receive the temperature sensed by the temperature sensor through the conductive connection portion during use.

3. The vapor generation device according to claim 2, wherein the conductive connection portion comprises a long and thin conductive pin.

4. The vapor generation device according to claim 2, wherein the conductive connection portion comprises an electrical contact formed on or integrated into a surface of the susceptor.

5. The vapor generation device according to claim 4, wherein the susceptor further comprises a base part configured to hold the first part and the second part; and
the electrical contact is formed on or integrated into a surface of the base part.

6. The vapor generation device according to claim 1, wherein the cavity has an opening end that receives the inhalable material in a removable manner; and
a protrusion height of at least a part of the second part relative to the first part gradually decreases in a direction close to the opening end.

7. The vapor generation device according to claim 1, wherein the cavity has an opening end that receives the inhalable material in a removable manner;
the accommodation cavity comprises a conical region whose cross-sectional area gradually decreases in a direction close to the opening end; and the temperature sensor is accommodated or encapsulated in the conical region.

8. The vapor generation device according to claim 1, wherein the first part is provided with a vacancy extending in a length direction; and the second part is constructed to be a pin or in a needle shape extending in the length direction, and is held in the vacancy.

9. The vapor generation device according to claim 1, wherein a surface of the second part is a smooth arc surface.

10. The vapor generation device according to claim 1, wherein the first sheet-like object and/or the second sheet-like object is provided with a protruding part protruding outward in the thickness direction, and the protruding part defines the accommodation cavity.

11. A susceptor for a vapor generation device, configured to be penetrated by a changing magnetic field and generate heat, to heat an inhalable material, wherein the susceptor is constructed in a blade shape extending in an axial direction of a cavity, and comprises:
a first part, having a first size in a thickness direction of the susceptor; and
a second part, having a second size in the thickness direction of the susceptor, the second size being greater than the first size, an accommodation cavity extending in the axial direction being arranged in the second part, and the accommodation cavity being configured to accommodate or encapsulate a temperature sensor that senses a temperature of the susceptor;
wherein the susceptor comprises a first sheet-like object and a second sheet-like object that are opposite to each other in the thickness direction, and are separate parts before assembly, the accommodation cavity is formed between the first sheet-like object and the second sheet-like object after being assembled.

12. The susceptor according to claim 11, wherein the temperature sensor further comprises a conductive connection portion at least partially located outside the susceptor, to receive the temperature sensed by the temperature sensor through the conductive connection portion during use.

13. The susceptor according to claim 12, wherein the conductive connection portion comprises a long and thin conductive pin.

14. The susceptor according to claim 12, wherein the conductive connection portion comprises an electrical contact formed on or integrated into a surface of the susceptor.

15. The susceptor according to claim 14, wherein the susceptor further comprises a base part configured to hold the first part and the second part; and
the electrical contact is formed on or integrated into a surface of the base part.

16. The susceptor according to claim 11, wherein the cavity has an opening end that receives the inhalable material in a removable manner; and
a protrusion height of at least a part of the second part relative to the first part gradually decreases in a direction close to the opening end.

17. The susceptor according to claim 11, wherein the cavity has an opening end that receives the inhalable material in a removable manner;
the accommodation cavity comprises a conical region whose cross-sectional area gradually decreases in a direction close to the opening end; and the temperature sensor is accommodated or encapsulated in the conical region.

18. The susceptor according to claim 11, wherein the first part is provided with a vacancy extending in a length direction; and the second part is constructed to be a pin or in a needle shape extending in the length direction, and is held in the vacancy.

19. The susceptor according to claim 11, wherein a surface of the second part is a smooth arc surface.

20. A vapor generation device, configured to heat an inhalable material to generate an aerosol, the device comprising:
a cavity, configured to accommodate the inhalable material;
a magnetic field generator, configured to generate a changing magnetic field; and
a susceptor, configured to be penetrated by the changing magnetic field and generate heat, to heat the inhalable material accommodated in the cavity; wherein
the susceptor is constructed in a blade shape extending in an axial direction of the cavity, and comprises:
a first part, having a first size in a thickness direction of the susceptor; and
a second part, having a second size in the thickness direction of the susceptor, the second size being greater than the first size, an accommodation cavity extending in the axial direction being arranged in the second part, and the accommodation cavity being configured to accommodate or encapsulate a temperature sensor that senses a temperature of the susceptor;
wherein the first part is provided with a vacancy extending in a length direction; and the second part is constructed to be a pin or in a needle shape extending in the length direction, and is held in the vacancy.

* * * * *